US012728651B2

(12) United States Patent
Nishida et al.

(10) Patent No.: US 12,728,651 B2
(45) Date of Patent: Sep. 8, 2026

(54) BASE-MATERIAL DRYING DEVICE AND PRINTING DEVICE

(71) Applicant: SCREEN HOLDINGS CO., LTD., Kyoto (JP)

(72) Inventors: Yoshihiro Nishida, Kyoto (JP); Shiro Kitawaki, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 224 days.

(21) Appl. No.: 18/160,425

(22) Filed: Jan. 27, 2023

(65) Prior Publication Data

US 2023/0249475 A1 Aug. 10, 2023

(30) Foreign Application Priority Data

Feb. 9, 2022 (JP) ................................ 2022-018971

(51) Int. Cl.
*B41J 11/00* (2006.01)
*B41J 2/145* (2006.01)
*B41J 29/02* (2006.01)

(52) U.S. Cl.
CPC ............ *B41J 11/002* (2013.01); *B41J 2/145* (2013.01); *B41J 11/0022* (2021.01); *B41J 11/007* (2013.01); *B41J 29/02* (2013.01)

(58) Field of Classification Search
CPC .................................................. B41J 11/0022
See application file for complete search history.

(56) References Cited

U.S. PATENT DOCUMENTS 3,626,603 A 12/1971 Breyer
3,694,928 A 10/1972 Barta et al.
3,737,091 A * 6/1973 Barta ................. B41F 23/0426 226/193

(Continued)

FOREIGN PATENT DOCUMENTS

CN 213353924 U 6/2021
EP 2 295 252 A1 3/2011

(Continued)

OTHER PUBLICATIONS

Extended European Search Report issued in corresponding European Patent Application No. 23153471.0-1014, dated Jun. 27, 2023.

(Continued)

*Primary Examiner* — Shelby L Fidler
(74) *Attorney, Agent, or Firm* — Rimon P.C.

(57) ABSTRACT

A dryer includes a plurality of transport rollers, turn bars, and a heater. Some of the transport rollers support the continuous base material transported in the +Y direction in a first position in the Z direction. Some of the transport rollers support the continuous base material transported in the −Y direction in a second position in the Z direction. The turn bars support the continuous base material in a third position in the Z direction while bending the continuous base material so that the continuous base material is transported in the −X direction. The heater is capable of heating part of the continuous base material in a position on the transport path TR between the transport rollers and the turn bars. The transport rollers and the turn bars are located on the second surface side of the continuous base material.

19 Claims, 8 Drawing Sheets

(56) References Cited

U.S. PATENT DOCUMENTS

| | | | | |
|---|---|---|---|---|
| 2007/0172285 | A1* | 7/2007 | Izawa | B41J 11/002 101/424.1 |
| 2011/0168041 | A1 | 7/2011 | Engelmann | |
| 2013/0215202 | A1 | 8/2013 | Koller et al. | |
| 2014/0240417 | A1 | 8/2014 | Toya | |
| 2015/0158311 | A1 | 6/2015 | Ogasawara et al. | |
| 2022/0063301 | A1* | 3/2022 | Tsutsui | F26B 3/30 |

FOREIGN PATENT DOCUMENTS

| | | | | | |
|---|---|---|---|---|---|
| EP | 2 623 328 | A1 | | 8/2013 | |
| JP | 2007-196513 | A | | 8/2007 | |
| JP | 2015-112792 | A | | 6/2015 | |
| JP | 2020-152036 | A | | 9/2020 | |
| JP | 2020194702 | A | * | 12/2020 | |
| JP | 2021-131176 | A | | 9/2021 | |
| KR | 100866597 | B1 | * | 11/2008 | B41F 23/0403 |
| WO | 2021/090719 | A1 | | 5/2021 | |

OTHER PUBLICATIONS

Notice of Reasons for Refusal issued in corresponding Japanese Patent Application No. 2022-018971, dated Sep. 30, 2025.

* cited by examiner

BASE-MATERIAL DRYING DEVICE AND PRINTING DEVICE

RELATED APPLICATIONS

This application claims the benefit of Japanese Application No. 2022-018971, filed on Feb. 9, 2022, the disclosure of which is incorporated by reference herein.

BACKGROUND OF THE INVENTION

Field of the Invention

The subject matter disclosed in the specification of the present application relates to a base-material drying device and a printing device.

Description of the Background Art

Printing devices have conventionally been known that perform printing by ejecting ink to the surface of a long band-like continuous base material while transporting the continuous base material over a plurality of transport rollers or the like. These printing devices may appropriately include a drying device that dries the ink while transporting the continuous base material. Here, there is the problem that, until the ink is dried, the transport rollers or other components cannot be brought into contact with the surface of the continuous base material to which the ink has been applied. It is thus necessary to set a long transport path in order to dry the ink.

For example, Japanese Patent Application Laid-Open No. 2021-131176 discloses a drying device that dries a continuous base material transported in an appropriately horizontal transport direction while transporting the continuous base material so as to fold it back multiple times in a vertical plane intersecting with the direction of transport. The dried continuous base material is transported out of the drying device while being moved along the vertical plane.

SUMMARY OF THE INVENTION

Technical Problem

According to Japanese Patent Application Laid-Open No. 2021-131176, the continuous base material is heated while being transported so as to be folded back multiple times in the same vertical plane. Thus, in order to secure a long transport path, there is no choice but to enlarge the vertical projection size of the drying device. This may result in upsizing of the drying device.

It is an object of the present invention to provide a technique that is able to increase the length and width of a transport path of a continuous base material in a drying device while suppressing an increase in the size of the drying device.

Solution to Problem

In order to solve the problem described above, a first aspect is a base-material drying device for drying ink adhering to a first surface of a continuous base material having a long band-like shape. The base-material drying device includes a first transport mechanism that transports the continuous base material from upstream to downstream along a predetermined transport path, and a first heating mechanism that heats the continuous base material transported by the first transport mechanism. The first transport mechanism includes a first transport supporter that supports, in a first position in a first direction, the continuous base material that is transported to one side in a second direction intersecting with the first direction, a second transport supporter that is arranged downstream of the first transport supporter and that supports, in a second position away from the first position in the first direction, the continuous base material that is transported to the other side in the second direction, and a third transport supporter that is arranged downstream of the second transport supporter and that supports the continuous base material in a third position in the first direction while bending the continuous base material so that the continuous base material is transported in a third direction intersecting with the first direction and the second direction. The first heating mechanism is capable of heating part of the continuous base material in a position on the transport path between the first transport supporter and the third transport supporter. The first transport supporter, the second transport supporter, and the third transport supporter are located on a second surface side of the continuous base material opposite to the first surface.

According to the base-material drying device of the first aspect, the continuous base material is transported while being shifted in the third direction. This allows extension of the transport path without enlarging the transport path in a plane that includes the first and second directions. Accordingly, it is possible to increase the length and width of the transport path while suppressing an increase in the size of the drying device. Besides, since the third transport supporter is arranged on the second surface side relative to the continuous base material, the third transport supporter is prevented from coming in contact with the first surface of the continuous base material. This prevents the ink that adheres to the first surface from adhering to the third transport supporter. It is also possible to suppress impairment of the image formed on the first surface.

A second aspect is the base-material drying device according to the first aspect, in which the third position is between the first position and the second position in the first direction.

According to the base-material drying device of the second aspect, it is possible to reduce the size of the drying device in the first direction.

A third aspect is the base-material drying device according to the first or second aspect, in which the first transport mechanism further includes a fourth transport supporter that is arranged downstream of the third transport supporter and that supports the continuous base material in a fourth position in the first direction while bending the continuous base material so that the continuous base material is transported to the one side in the second direction, and the fourth transport supporter is arranged on the second surface side of the continuous base material.

According to the base-material drying device of the third aspect, it is possible to extend the transport path of the continuous base material in the second direction.

A fourth aspect is the base-material drying device according to the third aspect, in which the transport path includes a first path that is part of a path from the second transport supporter to the third transport supporter, and a second path that is located downstream of the fourth transport supporter and that extends in parallel with the first path. The second path is located away from the first path in the third direction, and the first heating mechanism includes a heater capable of heating a portion of the continuous base material on the first path and a portion of the continuous base material on the second path at the same time.

According to the base-material drying device of the fourth aspect, it is possible to heat the continuous base material simultaneously on both of the first and second paths, which are parallel to each other.

A fifth aspect is the base-material drying device according to the third or fourth aspect, in which the first transport mechanism further includes a fifth transport supporter that is arranged downstream of the fourth transport supporter and that supports, in a fifth position away from the fourth position in the first direction, the continuous base material that is transported to the other side in the second direction.

A sixth aspect is the base-material drying device according to the fifth aspect, in which the first transport mechanism further includes a sixth transport supporter that is arranged downstream of the fifth transport supporter and that supports, in a sixth position in the first direction, the continuous base material that is transported to the one side in the second direction, and the fourth position is between the fifth position and the sixth position in the first direction.

A seventh aspect is the base-material drying device according to any one of the first to sixth aspects, in which the first transport mechanism further includes a seventh transport supporter that supports, in a seventh position in the first direction, the continuous base material that is transported to the one side in the second direction, and an eighth transport supporter that is arranged downstream of the seventh transport supporter and that supports, in an eighth position away from the seventh position in the first direction, the continuous base material that is transported to the other side in the second direction. The seventh transport supporter and the eighth transport supporter are arranged between the second transport supporter and the third transport supporter on the transport path. The seventh position and the eighth position are between the first position and the second position in the first direction. The third position is between the seventh position and the eighth position in the first direction. The seventh transport supporter and the eighth transport supporter are arranged on the second surface side of the continuous base material.

An eighth aspect is the base-material drying device according to the seventh aspect, in which a first base-material portion of the continuous base material is located between a second base-material portion of the continuous base material and a third base-material portion of the continuous base material in the second direction, the first base-material portion being transported in the first direction between the seventh transport supporter and the eighth transport supporter, the second base-material portion being transported in the first direction between the first transport supporter and the second transport supporter, the third base-material portion being transported in the first direction between the second transport supporter and the seventh transport supporter.

According to the base-material drying device of the eighth aspect, the continuous base material is transported in a spiral fashion. Thus, it is possible to increase the length and width of the transport path because.

A ninth aspect is the base-material drying device according to any one of the first to eighth aspects, in which the first heating mechanism is capable heating part of the continuous base material transported in the first direction, in a position on the transport path between the first transport supporter and the second transport supporter.

A tenth aspect is the base-material drying device according to any one of the first to ninth aspects, in which the first heating mechanism includes a transport chamber that allows passage of the continuous base material, and an airflow generator that generates an airflow flowing in a third direction inside the transport chamber.

An eleventh aspect is the base-material drying device according to the tenth aspect, in which the airflow generator includes a blower that sends air into the transport chamber, and an exhauster that exhausts the air in the transport chamber to an outside of the transport chamber.

A twelfth aspect is the base-material drying device according to the eleventh aspect, in which the blower sends heated air into the transport chamber.

A thirteenth aspect is the base-material drying device according to any one of the tenth to twelfth aspects, in which the first heating mechanism includes a pair of heaters arranged respectively on the first surface side and the second surface side of the continuous base material.

A fourteenth aspect is the base-material drying device according to the seventh or eighth aspect, in which the first heating mechanism includes a first heater that heats a portion of the continuous base material that is located between the first transport supporter and the seventh transport supporter on the transport path, and a second heater that heats a portion of the continuous base material that is located between the seventh transport supporter and the eighth transport supporter on the transport path.

According to the base-material drying device of the fourteenth aspect, it is possible to heat the portion of the continuous base material, which is located between the first transport supporter and the seventh transport supporter, and the portion of the continuous base material, which is located between the seventh transport supporter and the eighth transport supporter.

A fifteenth aspect is the base-material drying device according to the fourteenth aspect, in which the second heater supplies hot air from a position away from the continuous base material in the third direction.

According to the base-material drying device of the fifteenth aspect, hot air is supplied from one side in the third direction. Thus, even if the space that the continuous base material passes through is narrow, it is possible to heat the portion of the continuous base material that passes through that space.

A sixteenth aspect is the base-material drying device according to any one of the first to fifteenth aspects, in which the third transport supporter has an outer surface provided with an air outlet for ejecting air, the outer surface facing the second surface of the continuous base material.

According to the base-material drying device of the sixteenth aspect, the third transport supporter is prevented from coming in contact with the continuous base material. This suppresses misalignment in the transport position of the continuous base material due to friction.

A seventeenth aspect is the base-material drying device according to any one of the first to sixteenth aspects that further includes a second transport mechanism that transports the continuous base material along the transport path, and a second heater that heats the continuous base material that is transported by the second transport mechanism. The second transport mechanism is arranged downstream of the first transport mechanism, and the second transport mechanism includes the first transport supporter, the second transport supporter, and the third transport supporter.

According to the base-material drying device of the seventeenth aspect, it is possible to increase the length and width of the transport path along which the continuous base material is transported while being heated.

An eighteenth aspect is the base-material drying device according to the seventeenth aspect, in which the third transport supporter of the first transport mechanism supports the continuous base material that is transported to one side in the third direction, and the third transport supporter of the second transport mechanism supports the continuous base material that is transported to the other side in the third direction.

According to the base-material drying device of the eighteenth aspect, the continuous base material that has been moved to one side in the third direction by the first transport mechanism can be moved to the other side in the third direction by the second transport mechanism. This allows a reduction in the width of the transport path of the continuous base material in the third direction and downsizing of the base-material drying device.

A nineteenth aspect is a printing device that includes the base-material drying device described above and an image former that forms an image by ejecting ink to the first surface of the continuous base material transported to the base-material drying device.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
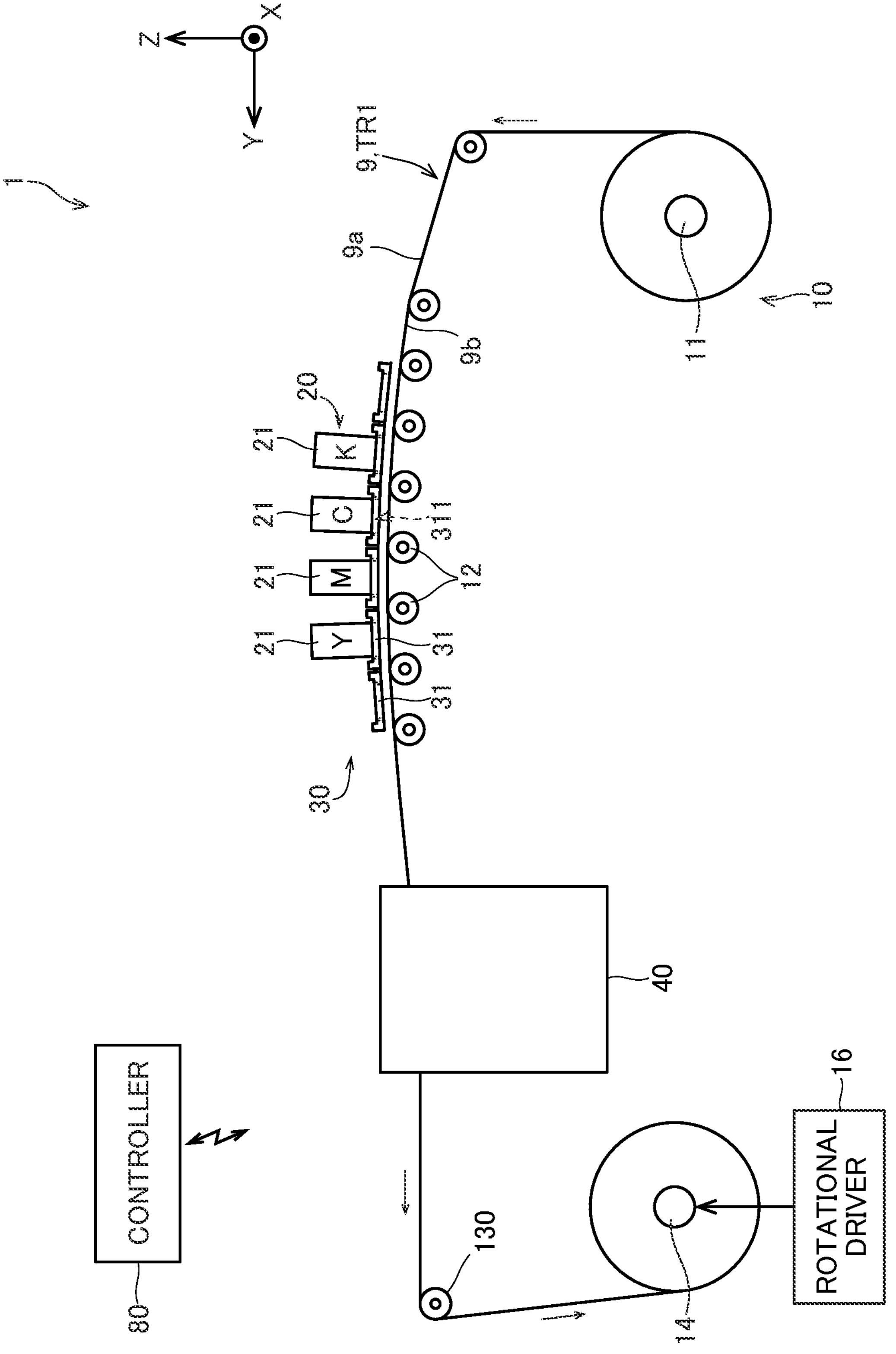
FIG. 1 is a schematic illustration of a configuration of an inkjet printing device according to an embodiment.

Hereinafter, embodiments of the present invention will be described with reference to the accompanying drawings. Note that constituent elements described in the embodiments are merely examples, and the scope of the present invention is not intended to be limited thereto. To facilitate understanding of the drawings, the dimensions or number of each constituent element may be illustrated in exaggerated or simplified form as necessary.

In the drawings, arrows that indicate X, Y, and Z direction orthogonal to one another are illustrated as appropriate. The X and Y directions are assumed to be horizontal directions parallel to a horizontal plane. The Z direction is assumed to be a direction parallel to the vertical direction. The direction indicated by the arrowhead of each arrow is assumed to be the plus (+) direction, and the direction opposite thereto is assumed to be the minus (−) direction. The X direction corresponds to a "third direction," the Y direction corresponds to a "second direction," and the Z direction corresponds to a "first direction." Note that the first to third directions may only need to intersect with one another and do not necessarily have to be orthogonal to one another.

1. First Embodiment

FIG. 1 is a schematic illustration of a configuration of an inkjet printing device 1 according to one embodiment. The inkjet printing device 1 is a device that records an image on the surface of a long band-like continuous base material 9 by ejecting droplets of ink (hereinafter, also referred to as "ink droplets") from a plurality of ejection heads 21 while transporting the continuous base material 9 along a prescribed transport path TR. The continuous base material 9 may, for example, be film or printing paper. The ink may, for example, be water-based ink. Note that the ink may be UV-curable ink that is cured upon receipt of irradiation with ultraviolet rays (UV). In this case, the inkjet printing device 1 may include an UV irradiator that applies UV.

The inkjet printing device 1 includes a transport mechanism 10, an image former 20, a support unit 30, and a dryer 40.

The transport mechanism 10 is a mechanism for transporting the continuous base material 9. The transport mechanism 10 transports the continuous base material 9 by a roll-to-roll method. The transport mechanism 10 includes a delivery roller 11, a plurality of transport rollers 12, a taking-up roller 14, and a rotational driver 16. The delivery roller 11, the transport rollers 12, and the taking-up roller 14 are each rotatable about an axis extending in the X direction, which is the horizontal direction. The rotational driver 16 rotates the taking-up roller 14. Note that the rotational driver 16 may rotate rollers (e.g., transport rollers 12) other than the taking-up roller 14.

The delivery roller 11 unreels the continuous base material 9 that is wound in a roll. Each transport roller 12 is arranged along the transport path TR of the continuous base material 9. The transport rollers 12 support the continuous base material 9 unreeled from the delivery roller 11 on the prescribed transport path TR. The taking-up roller 14 takes up the continuous base material 9 that has passed through the transport path TR in a roll.

In the following description, the direction of travel of the continuous base material 9 along the transport path TR is simply referred to as the "travel direction." In each drawing, the travel direction is indicated by an arrow as appropriate. The upstream side in the travel direction (the direction approaching the delivery roller 11) is simply referred to the "upstream side." The downstream side in the travel direction (the direction approaching the taking-up roller 14) is simply referred to as the "downstream side."

The image former 20 ejects water-based ink to the continuous base material 9 transported by the transport mechanism 10. The image former 20 may include, for example, four ejection heads 21. The four ejection heads 21 are aligned in order along the transport path TR. The four ejection heads 21 eject ink droplets of the colors including K (black), C (cyan), M (magenta), and Y (yellow), respectively, in order toward the downstream side of the transport path. The K, C, M, and Y ink droplets serve as color components of the color image. As a result of the four ejection heads 21 each ejecting ink droplets toward a first surface 9*a* of the continuous base material 9, a color image is formed on the first surface 9*a*.

The support unit 30 includes a plurality of support bases 31. The support bases 31 are arranged in order in the travel direction of the continuous base material 9. Each ejection head 21 is mounted on one of the support bases 31. Thus, the four ejection heads 21 are supported in fixed positions, and thereby the positional relationship of the four ejection heads 21 is fixed. Each support base 31 has a through hole 311 in the center in the travel direction. The through holes 311 penetrate the support bases 31 in the Z direction. The through holes 311 have inserted therein the lower end portions of the ejection heads 21. Accordingly, the lower surfaces of the ejection heads 21 attached to the support bases 31 face the first surface 9*a* of the continuous base material 9 without being blocked by the support bases 31.

The dryer 40 is arranged downstream of the image former 20. The dryer 40 heats the continuous base material 9 transported by the transport mechanism 10. The dryer 40 dries the ink applied to the first surface 9*a* of the continuous base material 9 by heating the continuous base material 9. The transport mechanism 10 transports the continuous base material 9 into the dryer 409 in an orientation with the first surface 9*a* facing toward the +Z side (an orientation with the second surface 9*b* facing toward the −Z side).

Figure 2:
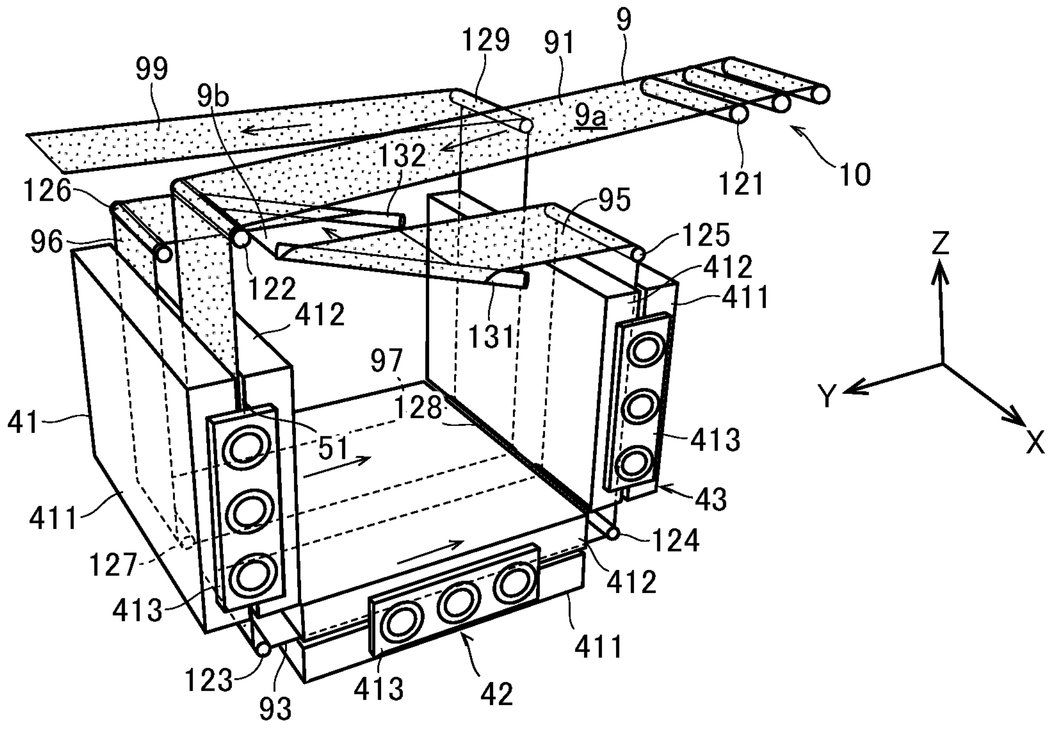
FIG. 2 is a perspective view of a configuration of a dryer.
Figure 3:
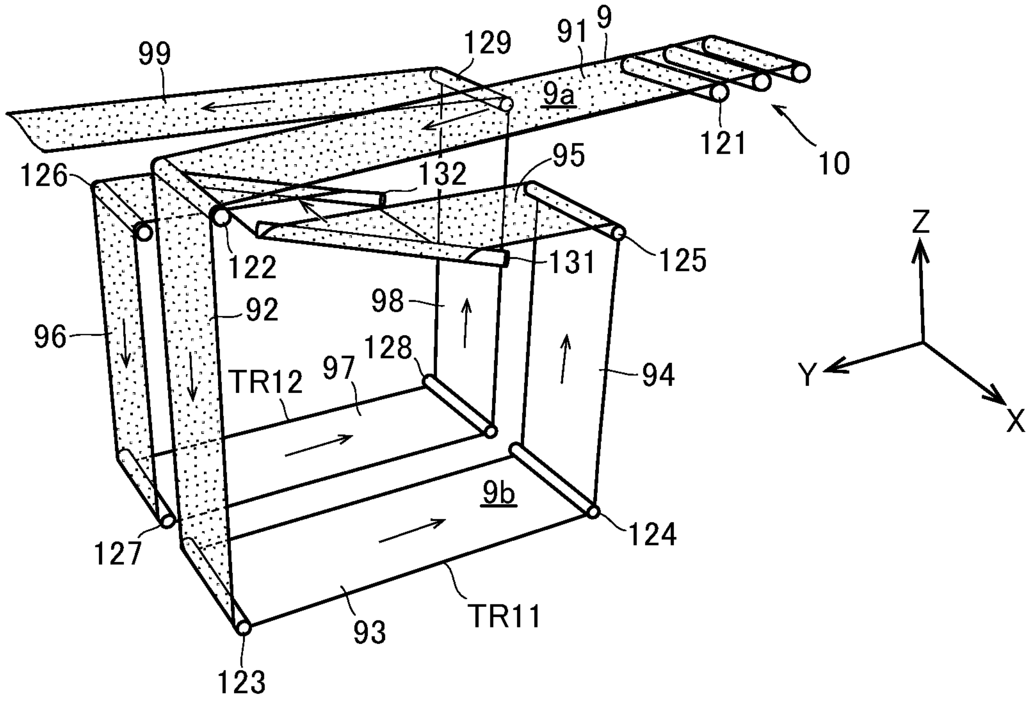
FIG. 3 is a perspective view of a continuous base material that is moving inside the dryer.
Figure 4:
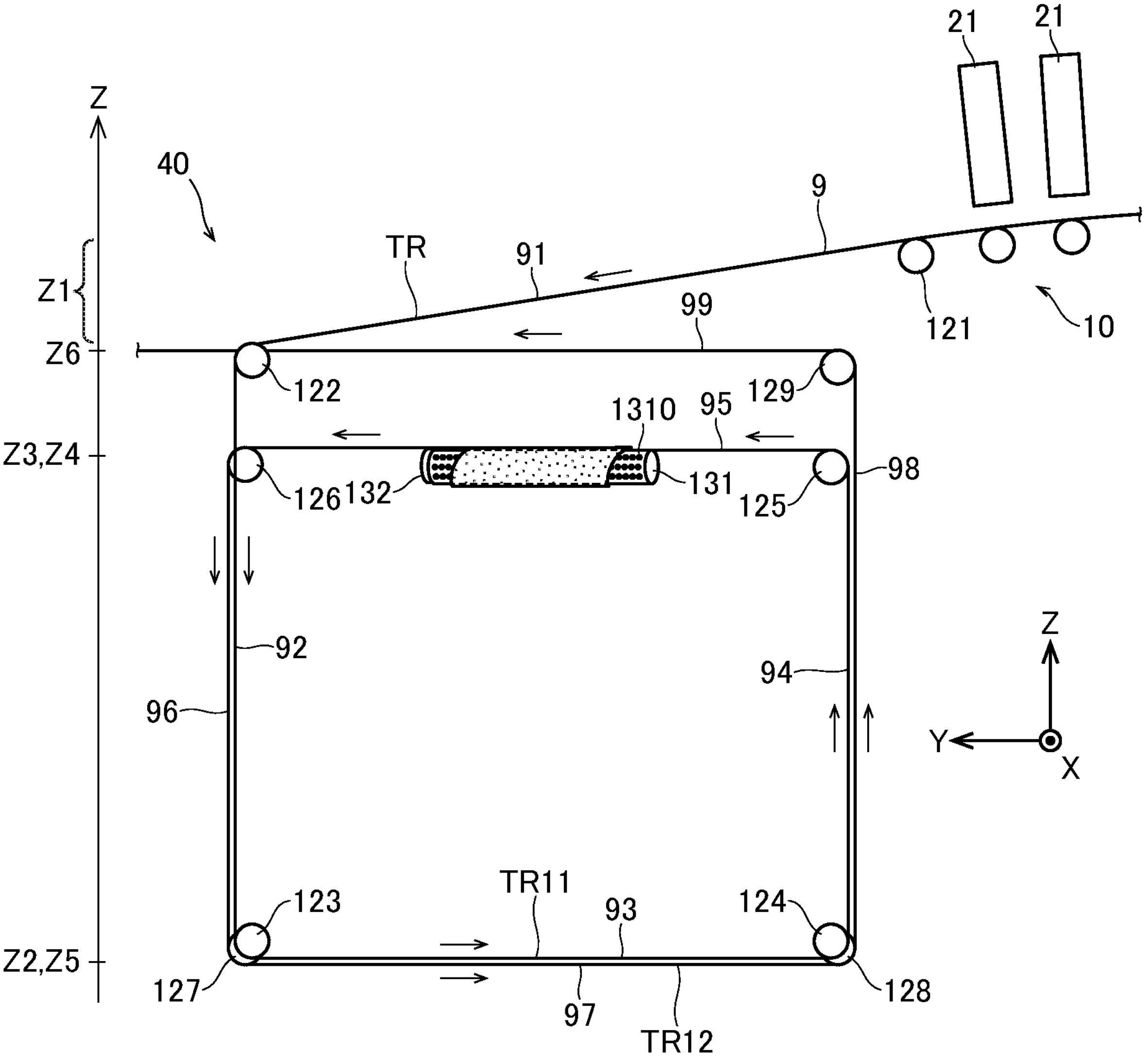
FIG. 4 is a side view of the continuous base material that is moving inside the dryer.
Figure 5:
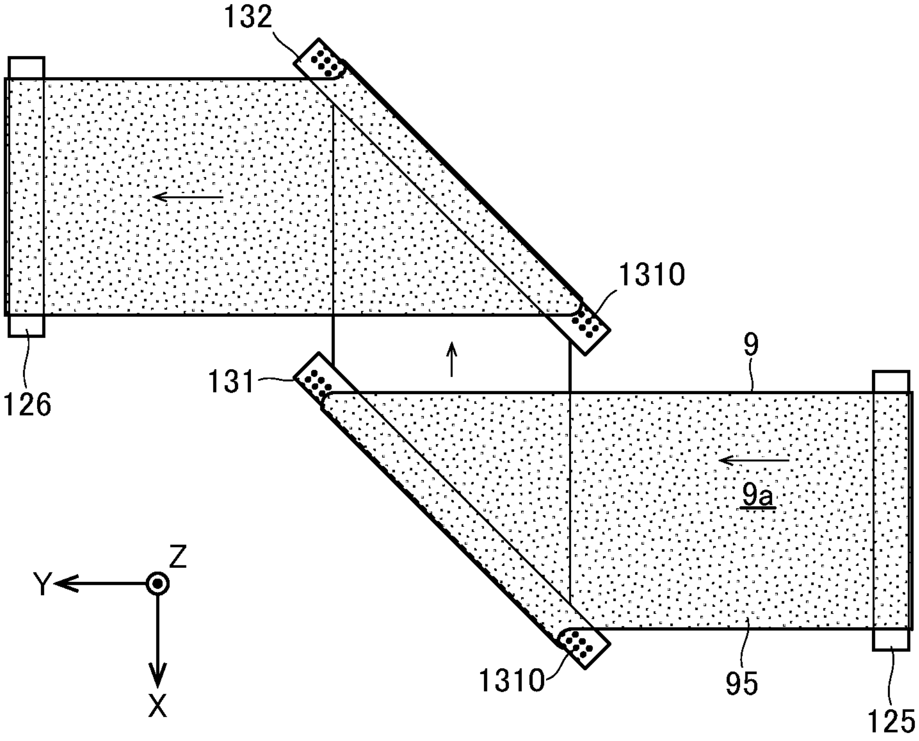
FIG. 5 is a plan view of the continuous base material whose travel direction is changed by turn bars.
Figure 6:
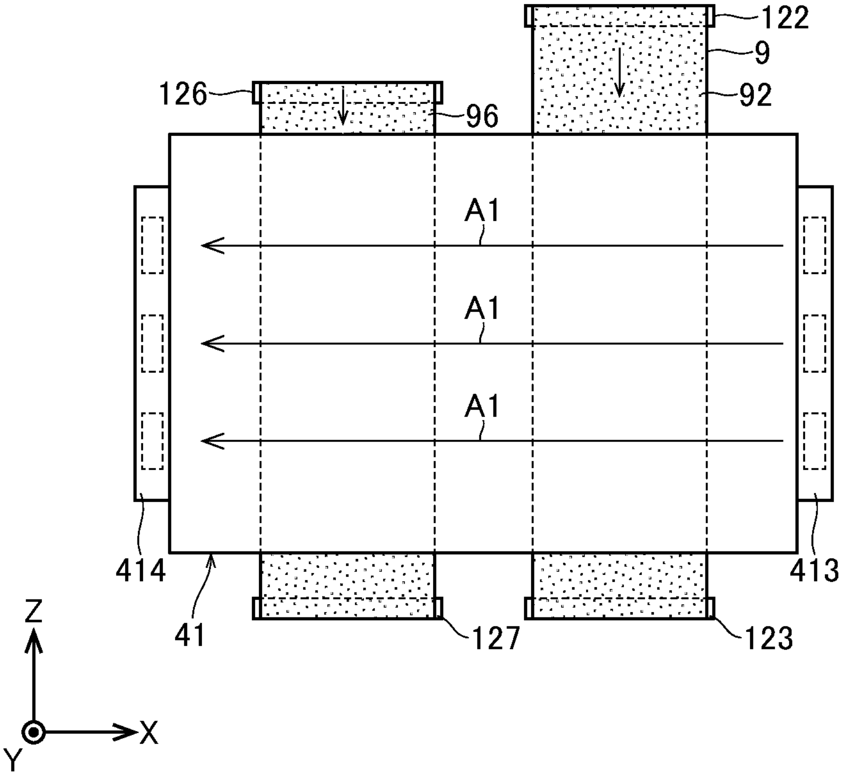
FIG. 6 is an illustration of a heater that heats the continuous base material.

FIG. 2 is a perspective view of a configuration of the dryer 40. FIG. 3 is a perspective view of the continuous base material 9 that is moving inside the dryer 40. FIG. 4 is a side view of the continuous base material 9 that is moving in the dryer 40. FIG. 5 is a plan view of the continuous base material 9 whose travel direction is changed by turn bars 131 and 132. FIG. 6 is an illustration of a heater 41 that heats the continuous base material 9. In order to facilitate a distinction between the first surface 9*a* and second surface 9*b* of the continuous base material 9, the dot pattern is appended as appropriate to the first surface 9*a* in the drawings.

As illustrated in FIGS. 2 and 3, the transport mechanism 10 includes transport rollers 121, 122, 123, 124, and 125, turn bars 131 and 132, and transport rollers 126, 127, 128, and 129 in order toward downstream along the transport path TR. The transport rollers 121 to 129 and the turn bars 131 and 132 are one example of a "first transport mechanism." The transport roller 126 is the first transport roller that comes in contact with the continuous base material 9 inside the dryer 40, and the transport roller 129 is the last transport roller that comes in contact with the continuous base material 9 inside the dryer 40. The base-material transport path between the transport rollers 126 and 129 has at least one heater arranged to heat and dry the continuous base material 9 that is moving inside the dryer 40 (in the first embodiment, heaters 41, 42, and 43, the details of which will be described later). These heaters are members that heat and dry a color image formed on the base material 9 by the ejection heads 21 of the image former 20. The transport path between the first transport roller 126 and the last transport roller 129 in the dryer 40 has no ejection head 21 for ejecting ink arranged thereabove.

The transport rollers 121 to 129 are each rotatable about an axis extending in the X direction. The transport roller 121 is arranged downstream of the image former 20. The transport roller 122 is located away from the transport roller 121 in the +Y direction. The transport roller 123 is located away from the transport roller 122 in the −Z direction. The transport roller 124 is located away from the transport roller 123 in the −Y direction. The transport roller 125 is located away from the transport roller 124 in the +Z direction. The transport roller 125 is located between the transport rollers 121 and 122 in the Z direction (first direction).

The transport roller 126 is located away from the transport roller 125 in the +Y direction. The transport roller 126 is also located away from the transport roller 125 in the −X direction. The transport roller 126 is located away from the transport roller 122 in the −Z direction and also away from the transport roller 122 in the −X direction. The transport roller 127 is located away from the transport roller 126 in the −Z direction. The transport roller 128 is located away from the transport roller 127 in the −Y direction. The transport roller 129 is located away from the transport roller 128 in the +Z direction.

As illustrated in FIGS. 2 and 3, the continuous base material 9 has a first portion 91, a second portion 92, a third portion 93, a fourth portion 94, a fifth portion 95, a sixth portion 96, a seventh portion 97, an eighth portion 98, and a ninth portion 99.

The first portion 91 is located between the transport rollers 121 and 122, the second portion 92 is located between the transport rollers 122 and 123, the third portion 93 is located between the transport rollers 123 and 124, the fourth portion 94 is located between the transport rollers 124 and 125, and the fifth portion 95 is located between the transport rollers 125 and 126. The sixth portion 96 is located between the transport rollers 126 and 127, the seventh portion 97 is located between the transport rollers 127 and 128, the eighth portion 98 is located between the transport rollers 128 and 129, and the ninth portion 99 is located between the transport rollers 129 and 130 (see FIG. 1).

When the transport mechanism 10 transports the continuous base material 9, the first portion 91 moves in the +Y direction, the second portion 92 moves in the −Z direction, the third portion 93 moves in the −Y direction, the fourth portion 94 moves in the +Z direction, and the fifth portion 95 moves in the +Y direction and the −X direction. The sixth portion 96 moves in the −Z direction, the seventh portion 97 moves in the −Y direction, the eighth portion 98 moves in the +Z direction, and the ninth portion 99 moves in the +Y direction.

The transport rollers 121 and 122 support, in a first position Z1 (see FIG. 4) in the Z direction (first direction), the continuous base material 9 that is transported in the +Y direction (one side in the second direction). The transport rollers 121 and 122 are one example of a "first transport supporter."

The transport rollers 123 and 124 support, in a second position Z2 (see FIG. 4) away from the transport rollers 121 and 122 in the −Z direction, the continuous base material 9 that is transported in the −Y direction. The transport rollers 123 and 124 are one example of a "second transport supporter."

The transport rollers 127 and 128 support, in a fifth position Z5 (see FIG. 4) away from the position of the turn bar 132 (fourth position Z4) in the −Z direction (see FIG. 4), the continuous base material 9 that is transported to the −Y side. The transport rollers 127 and 128 are one example of a "fifth transport supporter."

The transport roller 129 supports, in a sixth position Z6 away from the positions of the transport rollers 127 and 128 (fifth position Z5) in the +Z direction, the continuous base material 9 that is transported to the +Y side (see FIG. 4). The transport roller 129 is one example of a "sixth transport supporter."

The transport rollers 122 and 126 are arranged at the same position in the Y direction. The transport rollers 123 and 127 are arranged at the same position in the Y direction. Thus, the second portion 92 and the sixth portion 96 of the continuous base material 9 are arranged at the same position in the Y direction.

As illustrated in FIG. 4, the transport rollers 123 and 127 are arranged at the same position in the Y direction and the Z direction. The transport rollers 124 and 128 are arranged at the same position in the Y direction and the Z direction.

Thus, the third portion 93 and the seventh portion 97 of the continuous base material 9 are arranged at the same position in the Y direction and the Z direction.

The transport rollers 124 and 128 are arranged at the same position in the Y direction. The transport rollers 125 and 129 are also arranged at the same position in the Y direction. Thus, the fourth portion 94 and the eighth portion 98 of the continuous base material 9 are arranged at the same position in the Y direction.

The transport rollers 121 to 129 are all arranged on the side of the second surface 9*b* of the continuous base material 9. Thus, the transport rollers 121 to 129 do not come in contact with the first surface 9*a* of the continuous base material 9.

Turn Bars 131 and 132

The turn bars 131 and 132 support the continuous base material 9 without contact. The turn bars 131 and 132 are air turn bars that jets air to the outer peripheral surface. The turn bars 131 and 132 are located way from the transport roller 125 on the +Y side. The turn bar 132 is located away from the turn bar 131 on the −X side. The turn bars 131 and 132 extend in a direction that is parallel to the horizontal plane and that intersects with the X direction and the Y direction (the direction forming 45 degrees).

A illustrated in FIG. 4, the turn bars 131 and 132 are located between the transport rollers 122 and 123 in the Z direction. The turn bars 131 and 132 are also located between the transport rollers 125 and 126 in the Y direction.

As illustrated in FIG. 4, the turn bar 131 supports the continuous base material 9 in a third position Z3 in the Z direction. The turn bar 132 supports the continuous base material 9 in a fourth position Z4 in the Z direction. The third position Z3 and the fourth position Z4 are positions between the first position Z1 and the second position Z2 in the Z direction. As illustrated in FIG. 4, the position of the turn bar 131 in the Z direction (third position Z3) is the same as the position of the turn bar 132 in the Z direction (fourth position Z4).

The turn bar 131 supports the continuous base material 9 that is transported in the +Y direction while bending the continuous base material 9 such that the continuous base material 9 is transported in the −X direction (third direction). By bending the continuous base material 9 over the turn bar 131, the orientations of the first surface 9*a* and the second surface 9*b* of the continuous base material 9 are reversed. That is, the first surface 9*a* of the continuous base material 9 faces toward the −Z side, and the second surface 9*b* of the continuous base material 9 faces toward the +Z side. The turn bar 131 is one example of a “third transport supporter.”

The turn bar 132 supports the continuous base material 9 that is transported in the −X direction while bending the continuous base material 9 such that the continuous base material 9 is transported in the +Y direction (one side in the second directing. By bending the continuous base material 9 over the turn bar 132, the orientations of the first surface 9*a* and the second surface 9*b* of the continuous base material 9 are reversed. That is, the first surface 9*a* of the continuous base material 9 faces toward the +Z side, and the second surface 9*b* of the continuous base material 9 faces toward the −Z side. The turn bar 132 is one example of a “fourth transport supporter.”

The turn bars 131 and 132 are arranged on the side of the second surface 9*b* of the continuous base material 9. Thus, the turn bars 131 and 132 do not come in contact with the first surface 9*a* of the continuous base material 9. Accordingly, it is possible to suppress contamination of the turn bars 131 and 132 with the ink adhering to the first surface 9*a* and impairment of the printed image on the first surface 9*a* due to the turn bars 131 and 132.

As illustrated in FIGS. 4 and 5, the turn bars 131 and 132 each have an outer surface that faces the second surface 9*b* and that is provided with a plurality of air outlets 1310 for ejecting air. The ejection of air from the air outlets 1310 allows the continuous base material 9 to be supported without contact with the continuous base material 9. In this case, no friction force is generated between the continuous base material 9 and the turn bars 131 and 132. Thus, it is possible to suppress misalignment in the transport position of the continuous base material 9.

As illustrated in FIG. 3, the transport path TR includes a path TR11 from the transport roller 122 to the transport roller 125 and a path TR12 from the transport roller 126 to the transport roller 129. The path TR11 includes a path from the transport roller 123 (second transport supporter) to the turn bar 131 (third transport supporter). The path TR11 is one example of a “first path.” The path TR12 is located downstream of the turn bar 132 (fourth transport supporter). The path TR12 extends in parallel with the path TR11. The path TR12 is also located away from the path TR11 in the −X direction. The path TR12 is one example of a “second path.” The second portion 92, the third portion 93, and the fourth portion 94 of the continuous base material 9 are located on the path TR11. The sixth portion 96, the seventh portion 97, and the eighth portion 98 of the continuous base material 9 are located on the path TR12.

As illustrated in FIG. 2, the dryer 40 includes heaters 41, 42, and 43 that heat the continuous base material 9. The heater 41 is capable of heating part of the second portion 92 and part of the sixth portion 96 of the continuous base material 9 at the same time. The heater 42 is capable of heating part of the third portion 93 and part of the seventh portion 97 of the continuous base material 9 at the same time. The heater 43 is capable of heating part of the fourth portion 94 and part of the eighth portion 98 of the continuous base material 9 at the same time. That is, the heaters 41 to 43 are capable of heating the second portion 92, the third portion 93, the fourth portion 94 of the continuous base material 9, which are located on the path TR11, and the sixth portion 96, the seventh portion 97, and the eighth portion 98 of the continuous base material 9, which are located on the path TR12.

The simultaneous heating of a plurality of portions of the continuous base material 9 by the heaters 41, 42 and 43 improves the efficiency of drying the ink. The presence of the heaters 41, 42, and 43 enables reducing the size of the dryer 40 more than in the case where a heater for heating each portion of the continuous base material 9 may be provided individually.

Next, the configuration of the heaters 41, 42, and 43 will be described. Note that the heaters 42 and 43 have the same configuration as the heater 41. Thus, the following description mainly focuses on the configuration of the heater 41, and a description of the detailed configurations of the heaters 42 and 43 shall be omitted as appropriate.

As illustrated in FIGS. 2 and 6, the heater 41 includes a pair of hot plates 411 and 412, a blower 413, and an exhauster 414. The hot plate 411 is arranged on the side of the first surface 9*a* of the continuous base material 9. The hot plate 412 is arranged on the side of the second surface 9*b* of the continuous base material 9. The two hot plates 411 and 412 face each other with a fixed gap formed therebetween. That is, the pair of hot plates 411 and 412 forms a gap 51. The second portion 92 and the sixth portion 96 of the continuous base material 9 are both arranged in the gap 51 between the pair of hot plates 411 and 412 of the heater 41. The gap 51 is one example of a “transport chamber” that allows passage of the continuous base material 9.

The pair of hot plates 411 and 412 has a heater to radiate heat. Thus, portions of the continuous base material 9 that are sandwiched between the pair of hot plates 411 and 412 are heated by thermal radiation from the pair of hot plates 411 and 412. The pair of hot plates 411 and 412 is one example a “pair of heaters.”

The blower 413 is arranged at one end of the pair of hot plates 411 and 412 on the +X side. The blower 413 may be configured by, for example, a plurality of fans. The blower 413 sends air into the gap 51.

The exhauster 414 is arranged at the other end of the pair of hot plates 411 and 412 on the −X side. The exhauster 414 may be configured by, for example, a plurality of fans. The exhauster 414 exhausts the air in the gap 51 to the outside of the gap 51.

The blower 413 and the exhauster 414 generate an airflow A1 flowing in the −X direction in the gap 51. That is, the blower 413 and the exhauster 414 are one example of an “airflow generator.” Note that either one of the blower 413 and the exhauster 414 may be omitted. That is, the airflow A1 may be generated by only the blower 413 or by only the exhauster 414.

The continuous base material 9 can be dried by the blower 413 sending air into the gap 51. Moreover, the solvent (e.g., moisture) in the evaporated ink can be exhausted by exhausting air out of the exhausters 414. This facilitates ink drying on the continuous base material 9 in the gap 51.

Alternatively, the blower 413 may be configured to send heated air into the gap 51. In this case, the blower 413 may include a heat source for heating air.

According to the first embodiment, the continuous base material 9 is heated by the three heater 41, 42, and 43. Among these three heaters 41, 42, and 43, the heater 41 plays the most important role in drying the continuous base material 9. It is, however, noted that the heater 41 may be omitted.

Advantageous Effects

In the dryer 40, the continuous base material 9 is first transported in the +Y direction by the transport rollers 121 and 122 and then bent and transported in the −Y direction by the transport rollers 123 and 124. The continuous base material 9 is then transported in the −X direction by the turn bar 131 in the third position Z3 between the transport roller 122 in the first position Z1 and the transport roller 123 in the second position Z2. This configuration makes it possible to increase the length and width of the transport path TR while suppressing an increase in the size of the dryer 40 in the Y direction and the Z direction.

2. Second Embodiment

Next, a second embodiment will be described. In the following description, constituent elements that have functions similar to those of the already-described constituent elements are given either the same reference signals or reference signs with alphabetic characters appended thereto, and a detailed description thereof may be omitted.

Figure 7:
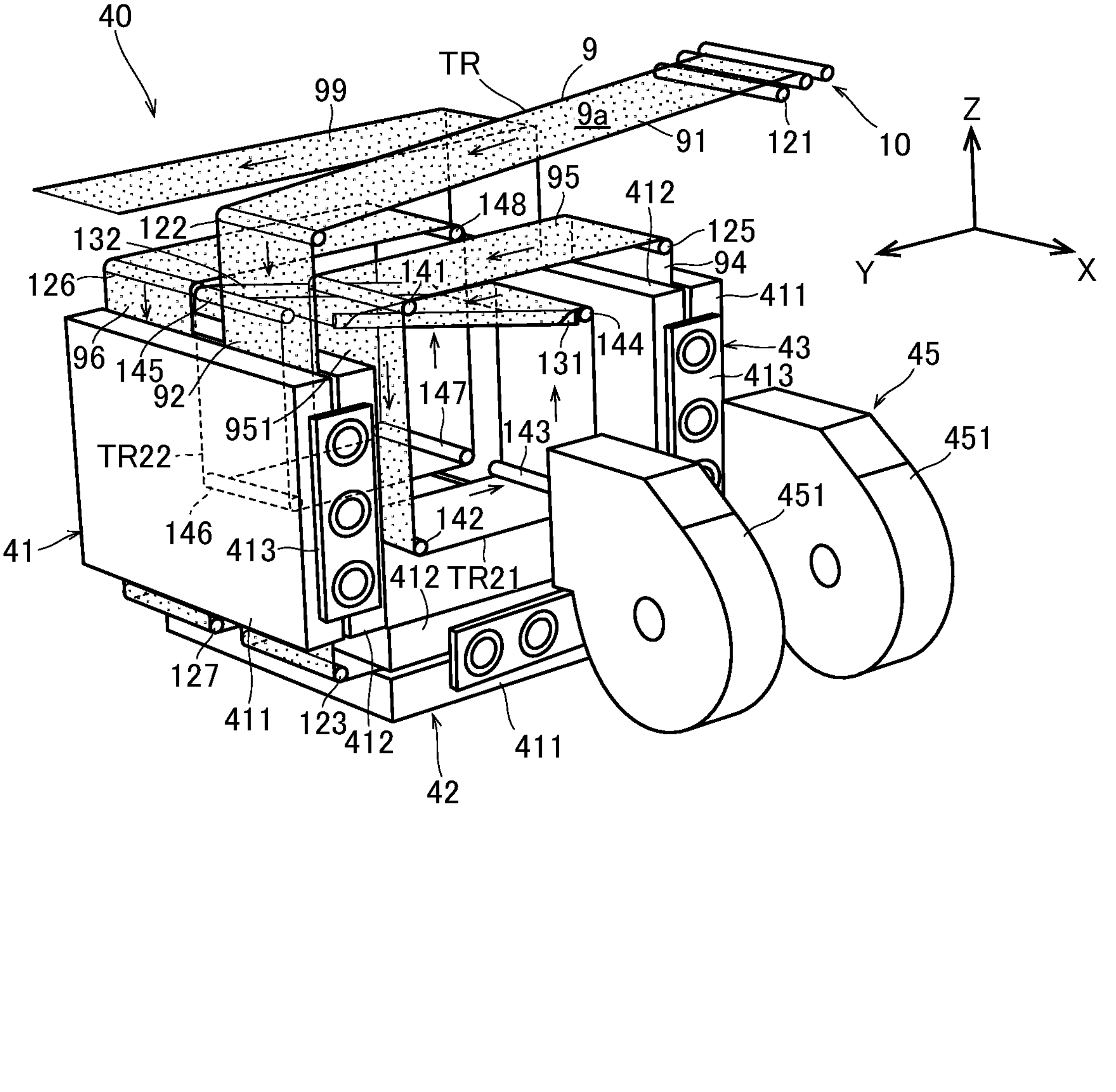
FIG. 7 is a perspective view of a transport mechanism and a dryer according to a second embodiment.

FIG. 7 is a perspective view of a transport mechanism 10 and a dryer 40 according to the second embodiment. The transport mechanism 10 according to the second embodiment further includes transport rollers 141, 142, 143, and 144 arranged in order toward downstream. The transport rollers 141 to 144 are arranged between the transport roller 125 and the turn bar 131 on the transport path TR.

The transport roller 141 is located away from the transport roller 125 in the +Y direction. The transport rollers 125 and 141 are arranged at the same position in the Z direction. The transport roller 142 is located away from the transport roller 141 in the −Z direction. The transport roller 143 is also located away from the transport roller 142 in the −Y direction. The transport rollers 142 and 143 are arranged at the same position in the Z direction. The transport roller 144 is located away from the transport roller 143 in the +Z direction. The transport roller 144 is located between the transport rollers 141 and 142 in the Z direction. The transport rollers 144 and 145 and the turn bars 131 and 132 are arranged at the same position in the Z direction. The turn bar 131 is located away from the transport roller 144 in the +Y direction.

The transport rollers 125 and 141 support, in a seventh position in the Z direction, the continuous base material 9 that is transported in the +Y direction. The transport rollers 125 and 141 are one example of a “seventh transport supporter.” The transport rollers 141 and 142 support the continuous base material 9 transported in the −Z direction. The transport rollers 142 and 143 support, at an eighth position in the Z direction, the continuous base material 9 that is transported in the −Y direction. The eighth position is a position away from the seventh position in the −Z direction. The transport rollers 142 and 143 are one example of an “eighth transport supporter.” The transport rollers 143 and 144 support the continuous base material 9 transported in the +Z direction.

As illustrated in FIG. 7, the continuous base material 9 has a portion 951 that is transported in the Z direction (first direction) between the transport roller 141 (seventh transport supporter) and the transport roller 142 (eighth transport supporter). The portion 951 (first base-material portion) of the continuous base material 9 is located between the second portion 92 (second base-material portion) and the fourth portion 94 (third base-material portion) of the continuous base material 9 in the Y direction (second direction). In this way, the portion of the transport path TR from the transport roller 122 to the transport roller 144 is set in an inwardly wound spiral fashion. By setting the transport path TR in such a spiral fashion, it is possible to increase the length and width of the transport path TR.

As illustrated in FIG. 7, the transport mechanism 10 according to the second embodiment includes the transport rollers 145, 146, 147, and 148. The transport rollers 145 to 148 are located between the turn bar 132 and the transport roller 126 on the transport path TR. The transport rollers 145 to 148 are each rotatable about an axis extending in the X direction.

The transport roller 145 is located away from the turn bar 132 in the +Y direction. The transport roller 146 is located away from the transport roller 145 in the −Z direction. The transport roller 147 is located away from the transport roller 146 in the −Y direction. The transport roller 148 is located away from the transport roller 147 in the +Z direction. The transport roller 126 is located away from the transport roller 148 in the +Y direction. The transport rollers 145 and 146 hold the continuous base material 9 that is transported in the −Z direction. The transport rollers 146 and 147 hold the continuous base material 9 that is transported in the −Y direction. The transport rollers 147 and 148 hold the continuous base material 9 that is transported in the +Z direction. The transport rollers 148 and 126 hold the continuous base material 9 that is transported in the +Y direction.

The transport rollers 145, 146, 147, and 148 are arranged at the same positions as the transport rollers 141, 142, 143, and 144, respectively, in the Y direction. The transport roller 145 is located away from the transport roller 141 on the −Z side. The transport roller 148 is located away from the transport roller 144 in the +Z direction. The transport rollers 148 and 125 are located at the same position in the Z direction.

As illustrated in FIG. 7, out of the transport path TR, a path from the transport roller 145 to the transport roller 129 is set in an outwardly expanding spiral fashion.

The transport rollers 141 to 144 are located between the hot plate 412 of the heater 41 and the hot plate 412 of the heater 43 in the Y direction. The transport rollers 141 to 144 are also located closer to the +Z side than the hot plate 412 of the heater 42. That is, out of the transport path TR, a path TR21 from the transport roller 141 to the transport roller 144 is set to be located in a position that is between the heaters 41 and 43 in the Y direction and that is closer to the +Z side than the heater 42.

The transport rollers 145 to 148 are located between the hot plate 412 of the heater 41 and the hot plate 412 of the heater 43 in the Y direction. The transport rollers 145 to 148 are also located closer to the +Z side than the hot plate 412 of the heater 42. Thus, out of the transport path TR, a path TR22 from the transport roller 145 to the transport roller 148 is set to be located in a position that is between the heaters 41 and 43 in the Y direction and that is closer to the +Z side than the heater 42.

The dryer 40 according to the second embodiment includes a heater 45. The heater includes two hot-air suppliers 451. Each hot-air supplier 451 supplies hot air to the −X direction to the space that is between the heaters 41 and 43 in the Y direction and that is closer to the +Z size than the heater 42. The hot air supplied from each hot-air supplier 451 heats the fifth portion 95 of the continuous base material 9.

The heater 45 is one example of a "second heater" for heating a portion of the continuous base material 9 that is located between the transport roller 141 (seventh transport supporter) and the transport roller 143 (eighth transport supporter) on the transport path TR. The heaters 41 to 43 are one example of a "first heater" for heating a portion of the continuous base material 9 that is located between the transport roller 122 (first transport supporter) and the transport roller 125 (seventh transport supporter) on the transport path TR.

The hot air supplied from the +X side to the continuous base material 9 heats the portion of the continuous base material 9 that is moving along the path TR21 and the portion of the continuous base material 9 that is moving along the path TR22 at the same time. Thus, downsizing of the dryer 40 is made possible as compared with the case in which the portions of the continuous base material 9 that are moving along the paths TR21 and TR22 are heated by different heaters.

3. Third Embodiment

Figure 8:
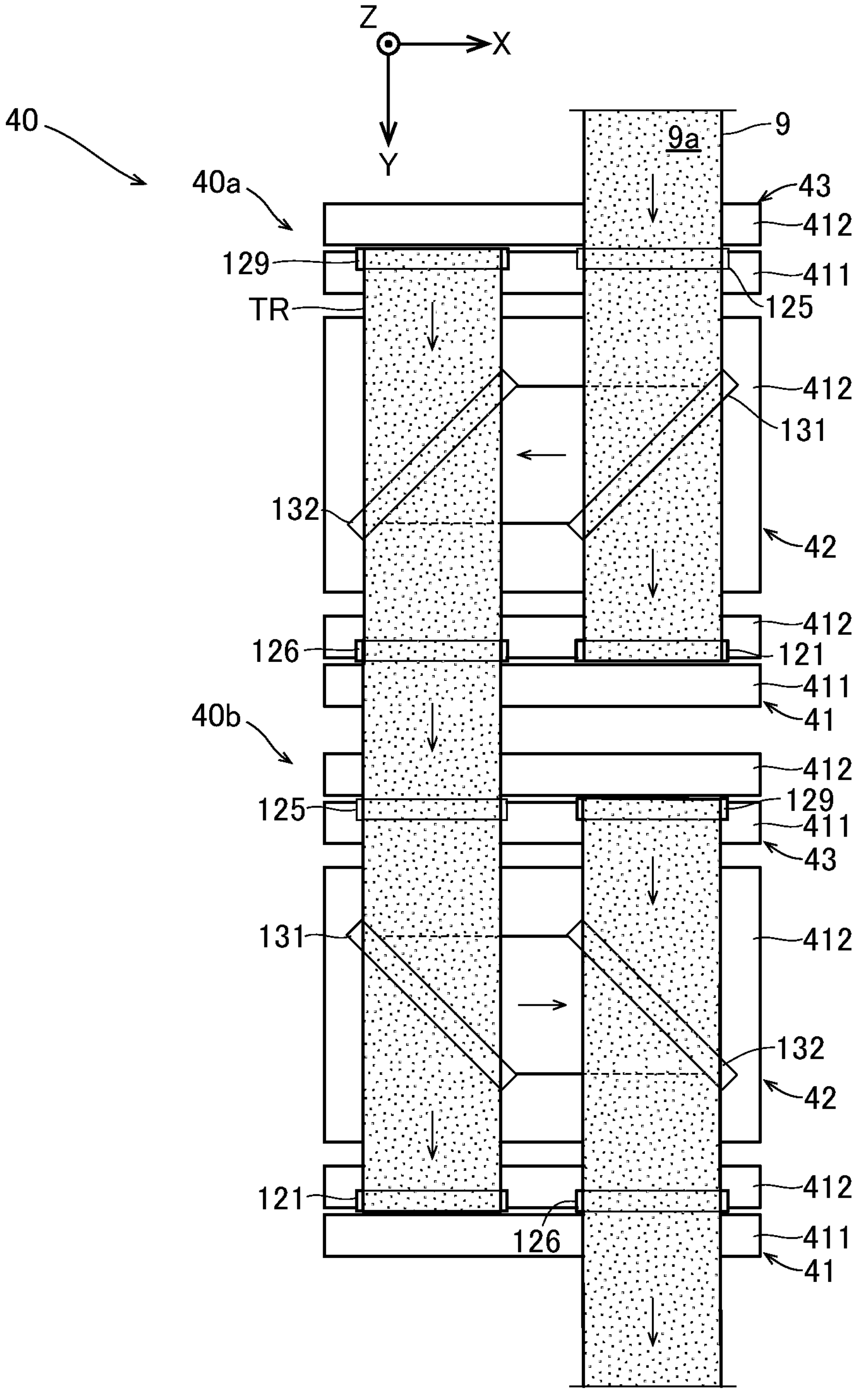
FIG. 8 is a plan view of a dryer according to a third embodiment.

FIG. 8 is a plan view of a dryer 40 according to a third embodiment. The dryer 40 according to the third embodiment includes a first dryer 40*a* and a second dryer 40*b* that are arranged adjacent to each other in the Y direction. The first dryer 40*a* and the second dryer 40*b* each have a configuration similar to that of the dryer 40 illustrated in FIG. 2. It is, however, noted that the positional relationship of the constituent elements of the second dryer 40*b* is such that the constituent elements of the first dryer 40*a* are arranged symmetrically with respect to a bilateral symmetry axis extending in Y direction. Therefore, in the first dryer 40*a*, the continuous base material 9 is bent by the turn bar 131 so as to be transported in the −X direction, but in the second dryer 40*b*, the continuous base material 9 is bent by the turn bar 131 so as to be transported in the +X direction.

The transport rollers 121 to 129 and the turn bars 131 and 132 arranged in the first dryer 40*a* correspond to the "first transport mechanism." The transport rollers 121 to 129 and the turn bars 131 and 132 arranged in the second dryer 40*b* correspond to the "second transport mechanism."

By coupling the first dryer 40*a* and the second dryer 40*b*, the continuous base material 9 that has moved in the −X direction by the turn bar 131 arranged in the first dryer 40*a* is moved in the +X direction by the turn bar 131 arranged in the second dryer 40*b*. This configuration enables reducing the entire width of the transport path TR in the X direction.

In the present example, the position of the turn bar 132 of the second dryer 40*b* in the X direction is made to match the position of the turn bar 131 of the first dryer 40*a* in the X direction. Accordingly, the position in the X direction in which the continuous base material 9 is transported out of the second dryer 40*b* can match the position of the continuous base material 9 transported into the first dryer 40*a*. In the present example, the position of the turn bar 132 of the first dryer 40 in the X direction is also made to match the position of the turn bar 131 of the second dryer 40*b* in the X direction.

By coupling the first dryer 40*a* and the second dryer 40*b*, it is possible to increase the length and width of the transport path TR. Besides, in each of the first dryer 40*a* and the second dryer 40*b*, the travel direction of the continuous base material 9 can be shifted in the X direction by the turn bar 131. This configuration enables increasing the length and width of the transport path TR while suppressing an increase in the size of the dryer 40*b* in the Z direction.

4. Variations

While embodiments have been described thus far, the present invention is not intended to be limited to the embodiments described above, and may be modified in various ways.

The positions of the transport rollers 121 to 129, the turn bars 131 and 132, and the transport rollers 141 to 148 described in the above embodiments are merely examples and may be appropriately changed. For example, the positions of the turn bars 131 and 132 in the Z direction may be changed. That is, the position of the turn bars 131 and 132 in the Z direction according to the first embodiment may be above the first position Z1, or may be below the second position Z2 or the fifth position Z5, instead of being the current third position Z3. The same applies to the second embodiment, and the positions of the turn bars 141 to 148 in the Z direction may be appropriately changed.

While the invention has been shown and described in detail, the foregoing description is in all aspects illustrative and not restrictive. It is therefore understood that numerous modifications and variations that are not described above can be devised without departing from the scope of the invention. The configurations in the embodiment and variations described above may be appropriately combined or omitted as long as there are no mutual inconsistencies.

What is claimed is:

1. A base-material drying device for drying ink adhering to a first surface of a continuous base material having a long band-like shape, the base-material drying device comprising:

a first transport mechanism that transports the continuous base material from upstream to downstream along a predetermined transport path; and a first heating mechanism that heats the continuous base material transported by the first transport mechanism, wherein the first transport mechanism includes:

a first transport supporter that supports, in a first position in a first direction, the continuous base material that is transported to one side in a second direction intersecting with the first direction;

a second transport supporter that is arranged downstream of the first transport supporter and that supports, in a second position away from the first position in the first direction, the continuous base material being transported from the first transport supporter to one side in the first direction to be transported to the other side in the second direction; and a third transport supporter that is arranged downstream of the second transport supporter and that supports the continuous base material in a third position in the first direction while bending the continuous base material being transported from the second transport supporter to the other side in the first direction so that the continuous base material is transported in a third direction orthogonal to the first direction and the second direction, the third position is between the first position and the second position in the first direction, the first heating mechanism is capable of heating part of the continuous base material in a position on the transport path between the first transport supporter and the third transport supporter, the first transport supporter, the second transport supporter, and the third transport supporter are located on a second surface side of the continuous base material opposite to the first surface, and throughout an entirety passage in which the continuous base material is transported from the first transport supporter to the third transport supporter, the first surface of the continuous base material is maintained in a non-contact state with the first transport supporter, the second transport supporter, and the third transport supporter.

2. The base-material drying device according to claim 1, wherein the first transport mechanism further includes:

a fourth transport supporter that is arranged downstream of the third transport supporter and that supports the continuous base material in a fourth position in the first direction while bending the continuous base material so that the continuous base material is transported to the one side in the second direction, and the fourth transport supporter is arranged on the second surface side of the continuous base material.

3. The base-material drying device according to claim 2, wherein the first transport mechanism further includes:

a fifth transport supporter that is arranged downstream of the fourth transport supporter and that supports, in a fifth position away from the fourth position in the first direction, the continuous base material that is transported to the other side in the second direction.

4. The base-material drying device according to claim 3, wherein the first transport mechanism further includes:

a sixth transport supporter that is arranged downstream of the fifth transport supporter and that supports, in a sixth position in the first direction, the continuous base material that is transported to the one side in the second direction, and the fourth position is between the fifth position and the sixth position in the first direction.

5. The base-material drying device according to claim 1, wherein the first heating mechanism is capable of heating part of the continuous base material transported in the first direction, in a position on the transport path between the first transport supporter and the second transport supporter.

6. The base-material drying device according to claim 1, wherein the first heating mechanism includes:

a transport chamber that allows passage of the continuous base material; and an airflow generator that generates an airflow flowing in a third direction inside the transport chamber.

7. The base-material drying device according to claim 6, wherein the airflow generator includes:

a blower that sends air into the transport chamber; and an exhauster that exhausts the air in the transport chamber to an outside of the transport chamber.

8. The base-material drying device according to claim 7, wherein the blower sends heated air into the transport chamber.

9. The base-material drying device according to claim 6, wherein the first heating mechanism includes a pair of heaters arranged respectively on the first surface side and the second surface side of the continuous base material.

10. The base-material drying device according to claim 1, wherein the third transport supporter has an outer surface provided with an air outlet for ejecting air, the outer surface facing the second surface of the continuous base material.

11. The base-material drying device according to claim 1, further comprising:

a second transport mechanism that transports the continuous base material along the transport path; and a second heater that heats the continuous base material that is transported by the second transport mechanism, wherein the second transport mechanism is arranged downstream of the first transport mechanism, and the second transport mechanism includes the first transport supporter, the second transport supporter, and the third transport supporter.

12. The base-material drying device according to claim 11, wherein the third transport supporter of the first transport mechanism supports the continuous base material that is transported to one side in the third direction, and the third transport supporter of the second transport mechanism supports the continuous base material that is transported to the other side in the third direction.

13. A printing device comprising:

the base-material drying device according to claim 1; and an image former that forms an image by ejecting ink to the first surface of the continuous base material transported to the base-material drying device.

14. The base-material drying device according to claim 1, wherein the second transport supporter includes at least two transport rollers spaced apart in the second direction, and the continuous base material is transported between the at least two transport rollers without supporting the first surface.

15. A base-material drying device for drying ink adhering to a first surface of a continuous base material having a long band-like shape, the base-material drying device comprising:

a first transport mechanism that transports the continuous base material from upstream to downstream along a predetermined transport path; and a first heating mechanism that heats the continuous base material transported by the first transport mechanism, wherein the first transport mechanism includes:

a first transport supporter that supports, in a first position in a first direction, the continuous base material that is transported to one side in a second direction intersecting with the first direction;

a second transport supporter that is arranged downstream of the first transport supporter and that supports, in a second position away from the first position in the first direction, the continuous base material being transported from the first transport supporter to one side in the first direction to be transported to the other side in the second direction; and a third transport supporter that is arranged downstream of the second transport supporter and that supports the continuous base material in a third position in the first direction while bending the continuous base material being transported from the second transport supporter to the other side in the first direction so that the continuous base material is transported in a third direction intersecting with the first direction and the second direction, the first heating mechanism is capable of heating part of the continuous base material in a position on the transport path between the first transport supporter and the third transport supporter, the first transport supporter, the second transport supporter, and the third transport supporter are located on a second surface side of the continuous base material opposite to the first surface, throughout an entirety passage in which the continuous base material is transported from the first transport supporter to the third transport supporter, the first surface of the continuous base material is maintained in a non-contact state with the first transport supporter, the second transport supporter, and the third transport supporter, the first transport mechanism further includes a fourth transport supporter that is arranged downstream of the third transport supporter and that supports the continuous base material in a fourth position in the first direction while bending the continuous base material so that the continuous base material is transported to the one side in the second direction, the fourth transport supporter is arranged on the second surface side of the continuous base material, the transport path includes:

a first path that is part of a path from the second transport supporter to the third transport supporter; and a second path that is located downstream of the fourth transport supporter and that extends in parallel with the first path, the second path is located away from the first path in the third direction, and the first heating mechanism includes a heater capable of heating a portion of the continuous base material on the first path and a portion of the continuous base material on the second path at the same time.

16. A base-material drying device for drying ink adhering to a first surface of a continuous base material having a long band-like shape, the base-material drying device comprising:

first transport mechanism that transports the continuous base material from upstream to downstream along a predetermined transport path; and a first heating mechanism that heats the continuous base material transported by the first transport mechanism, wherein the first transport mechanism includes:

a first transport supporter that supports, in a first position in a first direction, the continuous base material that is transported to one side in a second direction intersecting with the first direction;

a second transport supporter that is arranged downstream of the first transport supporter and that supports, in a second position away from the first position in the first direction, the continuous base material that is transported to the other side in the second direction; and a third transport supporter that is arranged downstream of the second transport supporter and that supports the continuous base material in a third position in the first direction while bending the continuous base material so that the continuous base material is transported in a third direction intersecting with the first direction and the second direction, the first heating mechanism is capable of heating part of the continuous base material in a position on the transport path between the first transport supporter and the third transport supporter, the first transport supporter, the second transport supporter, and the third transport supporter are located on a second surface side of the continuous base material opposite to the first surface, the first transport mechanism further includes:

a seventh transport supporter that supports, in a seventh position in the first direction, the continuous base material that is transported to the one side in the second direction; and an eighth transport supporter that is arranged downstream of the seventh transport supporter and that supports, in an eighth position away from the seventh position in the first direction, the continuous base material that is transported to the other side in the second direction, the seventh transport supporter and the eighth transport supporter are arranged between the second transport supporter and the third transport supporter on the transport path, the seventh position and the eighth position are between the first position and the second position in the first direction, the third position is between the seventh position and the eighth position in the first direction, and the seventh transport supporter and the eighth transport supporter are arranged on the second surface side of the continuous base material.

17. The base-material drying device according to claim 16, wherein a first base-material portion of the continuous base material is located between a second base-material portion of the continuous base material and a third base-material portion of the continuous base material in the second direction, the first base-material portion being transported in the first direction between the seventh transport supporter and the eighth transport supporter, the second base-material portion being transported in the first direction between the first transport supporter and the second transport supporter, the third base-material portion being transported in the first direction between the second transport supporter and the seventh transport supporter.

18. The base-material drying device according to claim 16, wherein the first heating mechanism includes:

a first heater that heats a portion of the continuous base material that is located between the first transport supporter and the seventh transport supporter on the transport path; and a second heater that heats a portion of the continuous base material that is located between the seventh transport supporter and the eighth transport supporter on the transport path.

19. The base-material drying device according to claim 18, wherein the second heater supplies hot air from a position away from the continuous base material in the third direction.

* * * * *